United States Patent
Ying et al.

(10) Patent No.: US 10,193,584 B2
(45) Date of Patent: Jan. 29, 2019

(54) ADJUSTING AN ANTENNA CONFIGURATION OF A TERMINAL DEVICE IN A CELLULAR COMMUNICATION SYSTEM

(71) Applicant: Sony Mobile Communications Inc., Tokyo (JP)

(72) Inventors: Zhinong Ying, Lund (SE); Erik Bengtsson, Eslöv (SE)

(73) Assignee: Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 15/593,876

(22) Filed: May 12, 2017

(65) Prior Publication Data

US 2017/0346517 A1    Nov. 30, 2017

(30) Foreign Application Priority Data

May 30, 2016   (EP) .................................... 16171979

(51) Int. Cl.
*H04B 7/06* (2006.01)
*H04B 1/10* (2006.01)
(Continued)

(52) U.S. Cl.
CPC ........... *H04B 1/1081* (2013.01); *H01Q 1/242* (2013.01); *H01Q 1/273* (2013.01); *H04B 1/1027* (2013.01);
(Continued)

(58) Field of Classification Search
CPC .. H04B 7/0689; H04B 7/0608; H04B 7/0808; H04B 7/0871; H04B 7/0811;
(Continued)

(56) References Cited

U.S. PATENT DOCUMENTS

2008/0032633 A1* 2/2008 Harrison .............. H04B 7/0632
455/69
2013/0090141 A1* 4/2013 Hottinen ................ H04B 15/00
455/506
(Continued)

FOREIGN PATENT DOCUMENTS

WO    2008066468 A2    6/2008

OTHER PUBLICATIONS

European Search Report from corresponding European Application No. 16171979.4, dated Nov. 21, 2016.

*Primary Examiner* — Dong-Chang Shiue
(74) *Attorney, Agent, or Firm* — Tucker Ellis LLP

(57) ABSTRACT

A method for adjusting an antenna configuration of the terminal device (30) in a cellular communication system (10). The system (10) includes a base station (20) and a terminal device (30) having a plurality of antenna elements (40-43). In the terminal device (30) a plurality of preset antenna configurations is provided. Each antenna configuration defines at least one reception parameter for the plurality of antenna elements (40-43). For each antenna configuration of the plurality of preset antenna configurations the antenna configuration is applied to the plurality of antenna elements (40-43) and a reception characteristic of a signal transmission from the base station (20) is determined. Based on the plurality of reception characteristics one antenna configuration is selected and applied to the plurality of antenna elements (40-43) for further signal transmissions.

12 Claims, 4 Drawing Sheets

(51) Int. Cl.
- *H04B 17/336* (2015.01)
- *H01Q 1/24* (2006.01)
- *H01Q 1/27* (2006.01)
- *H04B 7/0404* (2017.01)
- *H04B 7/0452* (2017.01)
- *H04B 7/08* (2006.01)
- *H04L 25/02* (2006.01)

(52) U.S. Cl.
CPC ......... *H04B 7/0404* (2013.01); *H04B 7/0452* (2013.01); *H04B 7/0689* (2013.01); *H04B 7/0808* (2013.01); *H04B 7/0871* (2013.01); *H04B 7/0888* (2013.01); *H04B 17/336* (2015.01); *H04B 7/0608* (2013.01); *H04L 25/0224* (2013.01)

(58) Field of Classification Search
CPC .. H04B 7/0691; H04B 7/0874; H04B 7/0452; H04B 7/02; H04B 7/0404; H04B 7/0408; H04B 7/0413; H04L 25/0224
See application file for complete search history.

(56) References Cited

U.S. PATENT DOCUMENTS

| | | | | |
|---|---|---|---|---|
| 2014/0086077 | A1* | 3/2014 | Safavi | H04W 24/02 370/252 |
| 2014/0140224 | A1* | 5/2014 | Hakansson | H04B 7/0608 370/252 |
| 2014/0292090 | A1* | 10/2014 | Cordeiro | H02J 17/00 307/104 |
| 2015/0116153 | A1* | 4/2015 | Chen | H01Q 5/22 342/359 |

* cited by examiner

ADJUSTING AN ANTENNA CONFIGURATION OF A TERMINAL DEVICE IN A CELLULAR COMMUNICATION SYSTEM

RELATED APPLICATION DATA

This application claims the benefit of European Patent Application No. 16 171 979.4, filed May 30, 2016, the disclosure of which is incorporated herein by reference in its entirety.

FIELD

Various embodiments of the present invention relate to a method for adjusting an antenna configuration of a terminal device in a cellular communication system and to a terminal device for a cellular communication system.

BACKGROUND

The popularity of mobile data and voice communication continues to grow. The increasing popularity of data and voice communication requires that communication needs of a large number of users must be met, even in situations in which a large number of users are located within a small area. Typical examples for these situations include sports arenas, shopping malls or large office buildings.

The so-called multiple-input and multiple-output (MIMO) technology may be used in wireless radio telecommunication systems for increasing data transmission performance and reliability of a communication between a base station and terminal devices. The terminal devices may comprise for example mobile devices like mobile telephones, mobile computers and tablet computers as well as stationary devices like personal computers or cash registers. Typically, a terminal device may be assigned to a user and may therefore also be called user equipment.

MIMO systems may use multiple send and receive antennas for wireless communication at the base station as well as at the terminal device. The MIMO technology forms the basis for coding techniques which use the temporal as well as the spatial dimension for transmitting information. The enhanced coding in MIMO systems may increase the spectral and energy efficiency of the wireless communication.

The spatial dimension may be used by spatial multiplexing. The spatial multiplexing is a transmission technique in MIMO systems to transmit independent data signals, so-called streams, from each of the multiple antennas. Thus, a plurality of streams may be transmitted at the same time in parallel which is called a higher rank operation. For example, the rank may indicate the number of spatially separated data transmission streams between a user equipment and a base station. For example, a system with a base station having two antennas and the terminal device having two antennas, has the capability of operating in a rank of maximum 2 and is also called 2×2 system, indicating the number of antennas at the base station and at the terminal device.

For establishing the transmission of multiple independent data signals in a MIMO system, antenna parameters of the plurality of antennas have to be configured appropriately. For example phase, gain and amplitude parameters have to be set for each antenna. These parameters may depend on radio channel characteristics for each transmission. Therefore, in a MIMO system channel characteristics between the base station and the terminal device may be analyzed by a channel sounding procedure. The channel sounding procedure may include the transmission of pilot signals at predetermined times having a predetermined coding.

Additionally, or as an alternative, to meet the increasing demands in wireless communication, the radio communication may be moved to higher frequencies, for example radio signals with a frequency of several gigahertz may be used. For example, a frequency of 30 GHz or above may be used. However, when operating at higher frequencies, the aperture of a single antenna element becomes small. The antenna aperture, or effective area, defines how much power the antenna is exposed to. This will decrease transmission efficiency. For mitigating this, multiple antennas may be used for beamforming. However, this may raise the problem how to combine the signals from the multiple antennas for best performance.

In particular, in small terminal devices like mobile telephones or wearable devices, an antenna array comprising a plurality of antenna elements may comprise conformal antennas which may be arranged at different locations of the terminal device and which may have significantly different transmission properties with respect to polarization, phase and gain for different directions. Compared with an antenna array comprising a plurality of similar or identical antenna elements arranged in a regular form like a row (uniform linear array, ULA), a cooperating configuration of conformal antennas may be a complex task to steer. Hence there is no simple formula to create a steering vector. Furthermore, in poor transmission conditions, pilot signals of the channel sounding procedure may be near or below the noise floor making them hard to detect for configuration of the antenna elements.

SUMMARY

In view of the above, there is a need in the art for methods and devices which enable and improve transmissions at higher frequency bands, for example at 20 or 30 GHz or above, in wireless communication systems. Furthermore, there is a need in the art for methods and devices which enable and improve configuration of an antenna array in poor transmission conditions.

This object is achieved by the features of the independent claims. The dependent claims define embodiments of the invention.

A method for adjusting an antenna configuration of a terminal device in a cellular communication system, for example a cellular multiple-input and multiple-output (MIMO) system, is provided. The system comprises a base station and the terminal device. The terminal device comprises a plurality of antennas, a so-called antenna array. According to the method, a plurality of preset antenna configurations is provided in the terminal device. Each antenna configuration of the plurality of preset antenna configurations defines at least one reception parameter for the plurality of antenna elements. So at least one reception parameter may comprise for example for each antenna element of the plurality of antenna elements a corresponding phase information and amplitude information for combining the signals received via the antenna elements. For each antenna configuration of the plurality of preset antenna configurations the following is consecutively performed: the antenna configuration is applied to the plurality of antenna elements, and a reception characteristic of a signal transmission sent from the base station and received at the plurality of antennas is determined with the applied antenna configuration. In other words, each antenna configuration of the plurality of preset antenna configurations is applied one after the other to the plurality of antenna elements and a reception characteristic of the signal transmission is determined while the corresponding antenna configuration is applied. Thus, for each antenna configuration of the plurality of preset antenna configurations a corresponding reception characteristic is determined resulting in a plurality of reception characteristics. Based on the plurality of reception characteristics, one antenna configuration of the plurality of preset antenna configurations is selected. For example, the best reception characteristic of the plurality of reception characteristics is determined and the associated antenna configuration is selected. The selected antenna configuration is applied to the plurality of antenna elements for further signal transmissions.

This method may work under poor reception conditions, even if the received signal transmissions are near the noise floor such that a pilot based channel sounding mechanism can hardly be executed. Furthermore, the above-described method works with any kind of antenna elements, in particular also with an array of conformal antenna elements whose behaviour is much more difficult to determine than a linear array of homogeneous antenna elements.

According to an embodiment, the plurality of preset antenna configurations is provided in the terminal device as predefined data which has been specifically determined for the type of the terminal device during development of the type of terminal device. For example, during development of the type of terminal device the preset antenna configurations may be determined by simulations or laborious measurements for a number of reception scenarios. For example, the plurality of preset antenna configurations may comprise 20 to 50 antenna configurations for corresponding reception scenarios. Each preset antenna configuration may comprise reception parameters for each of the plurality of antenna elements. In particular, each preset antenna configuration may configure the plurality of antenna elements such that at least two antenna elements are active during reception or transmission of signals and thus at least two antenna elements contribute to the reception or transmission of signals. Each of the preset antenna configurations may be designed such that the plurality of antenna elements cooperate to receive a specific signal transmission, that means a rank 1 transmission only. However, in poor reception conditions, this may be most appropriate.

According to another embodiment, the applied antenna configuration is optimized by an iterative algorithm. For example, the applied antenna configuration may be optimized by a stepwise iterative search algorithm. Thus, starting from the preset antenna configuration, slight stepwise and iterated optimizations may be performed to adapt the antenna configuration to current reception conditions.

For example, a transmission frequency of the signal transmission is above 30 GHz. At such transmission frequencies an aperture of an antenna becomes small. Therefore, for increasing the received power, a plurality of antenna elements may be used. However, when using conformal antennas computing antenna parameters may become a complex task as the signals need to be coherently combined. Hence, the above-described use of preset antenna configurations may contribute to ease this task.

According to an embodiment, the reception characteristic comprises a signal-to-noise ratio. The signal-to-noise ratio may be easily determined even under bad reception conditions, for example based on a shadowing of the signal transmissions sent from the base station.

According to another embodiment, a method for adjusting an antenna configuration of a terminal device in a cellular communication system, for example a cellular MIMO communication system, is provided. The cellular system comprises a base station and the terminal device. The terminal device comprises a plurality of antenna elements. According to the method, a reception characteristic of a signal transmission sent from the base station and received at the plurality of antennas is determined. The determined reception characteristic is compared with a threshold value. Based on the comparison, either the antenna configuration is adjusted as described above, or the antenna configuration is adjusted according to a channel sounding procedure. For example, in case the reception characteristic shows that current reception conditions are poor, the above-described method using the plurality of preset antenna configurations may be performed. In case the current reception conditions are good, the channel sounding procedure may be conducted which may result in a higher rank transmission.

According to an embodiment, the signal transmission for which the reception characteristic is determined, comprises a pilot signal transmission of the channel sounding procedure sent from the base station and received at the plurality of antennas, or a payload signal transmission sent from the base station and received at the plurality of antennas. In other words, for determining the reception characteristic, any transmission from the base station may be evaluated.

The threshold value form deciding to perform either the channel sounding procedure or the above-described method using the plurality of preset antenna configurations, may have a ratio below 1 dB, preferably a value of 0 dB. Therefore, when the signal-to-noise ratio is low and the signal is near the noise floor, the above-described method using the plurality of preset antenna configurations will be used instead of using a channel sounding procedure.

A terminal device for a cellular communication system, for example a cellular multiple-input and multiple-output (MIMO) system, is provided. The cellular MIMO system comprises a base station and the terminal device. The terminal device comprises a plurality of antenna elements, a memory, and a processing unit. The memory stores a plurality of preset antenna configurations. Each antenna configuration of the plurality of preset antenna configurations defines at least one reception parameter for the plurality of antenna elements. The processing unit applies consecutively for each antenna configuration of the plurality of preset antenna configurations the corresponding antenna configuration to the plurality of antenna elements. Furthermore, the processing unit determines for each antenna configuration of the plurality of preset antenna configurations a reception characteristic of the signal transmission sent from the base station and received at the plurality of antennas with the applied antenna configuration. Based on the plurality of reception characteristics determined for the plurality of preset antenna configurations the processing unit selects one antenna configuration of the plurality of preset antenna configurations. Finally, the processing unit applies the selected antenna configuration to the plurality of antenna elements for further signal transmissions.

The terminal device may be configured to perform the above-described method and comprises therefore the above-described advantages.

According to an embodiment, the plurality of antenna elements comprises a conformal antenna element conforming a prescribed shape of a component of the terminal device. The component may comprise for example a housing of the terminal device or a printed circuit board of the terminal device. Each conformal antenna element may comprise for example a dipole antenna, a horn antenna or a patch antenna. Conformal antenna elements may be easily integrated in the components of the terminal device thus requiring no or less additional space. For example, four to sixteen antenna elements may be provided at a terminal device. The terminal device may comprise for example a user equipment like a mobile telephone, a mobile computer, a tablet computer, a wearable device, a mobile accessory, or a robotic device. A wearable device or a mobile accessory, also called smart mobile accessory or smart wearable device, may comprise a wearable computer, also known as body born computer or simply wearable, which is a miniature electronic device that may be worn by a user under, with or on top of clothing.

Although specific features described in the above summary and the following detailed description are described in connection with specific embodiments and aspects of the present invention, it should be noticed that the features of the exemplary embodiments and aspects may be combined with each other unless specifically noted otherwise.

BRIEF DESCRIPTION OF THE DRAWINGS

Various embodiments of the present invention will be described in more detail with reference to the accompanying drawings.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Any coupling between components or devices shown in the figures may be a direct or indirect coupling unless specifically noted otherwise.

Figure 1:
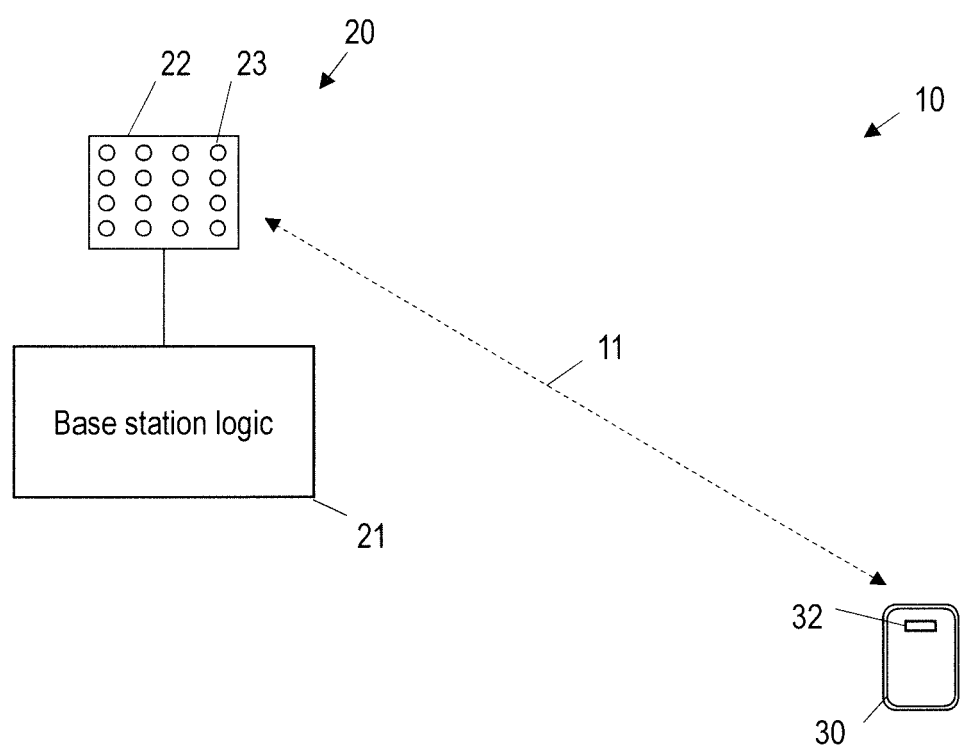
FIG. 1 shows schematically a wireless communication system according to an embodiment of the present invention.

FIG. 1 shows a communication system 10 according to an embodiment. The communication system 10 may be for example a wireless cellular communication system or a wireless local area network system. The communication system 10 comprises a base station 20, for example a base station of a cellular communication system or an access point of the wireless local area network system. The communication system comprises further terminal 30 which is arranged within a radio communication range of the base station 20. The terminal 30 may comprise for example a user equipment like a mobile telephone, a tablet computer, a wearable device or a mobile accessory. Furthermore, the terminal 30 may comprise for example a stationary or mobile station like a cash register, a credit card reader, the control device of a home or office automation system, a robotic device, a drone, or a moving cell in for example a vehicle. Although in FIG. 1 shows only one terminal 30, in the communication system 10 a plurality of terminals may be arranged and may be configured to communicate with the base station 20 as will be described in the following.

The base station 20 comprises a base station logic 21 and an antenna structure 22. The base station logic 21 may comprise for example a controller, computer or microprocessor. The antenna structure 22 may comprise a single antenna or a plurality of antennas which are indicated by circles in FIG. 1. One exemplary antenna element of the plurality of antenna elements is indicated by reference sign 23. The antenna elements 23 may be arranged in a two-dimensional or three-dimensional spatial array on a carrier. The base station 20 may comprise furthermore associated (not shown) transceivers for the antenna elements 23. The base station 20 may operate in a multiple-input and multiple-output (MIMO) mode. Accordingly, the base station 20 may have several tens or in excess of 100 antenna elements 23.

The terminal 30 comprises an antenna array 32 comprising a plurality of antenna elements. Thus, a radio transmission 11 between the base station 20 and the terminal 30 may be established. In particular, a signal transmission may be sent from the base station 20 to the terminal 30.

Figure 2:
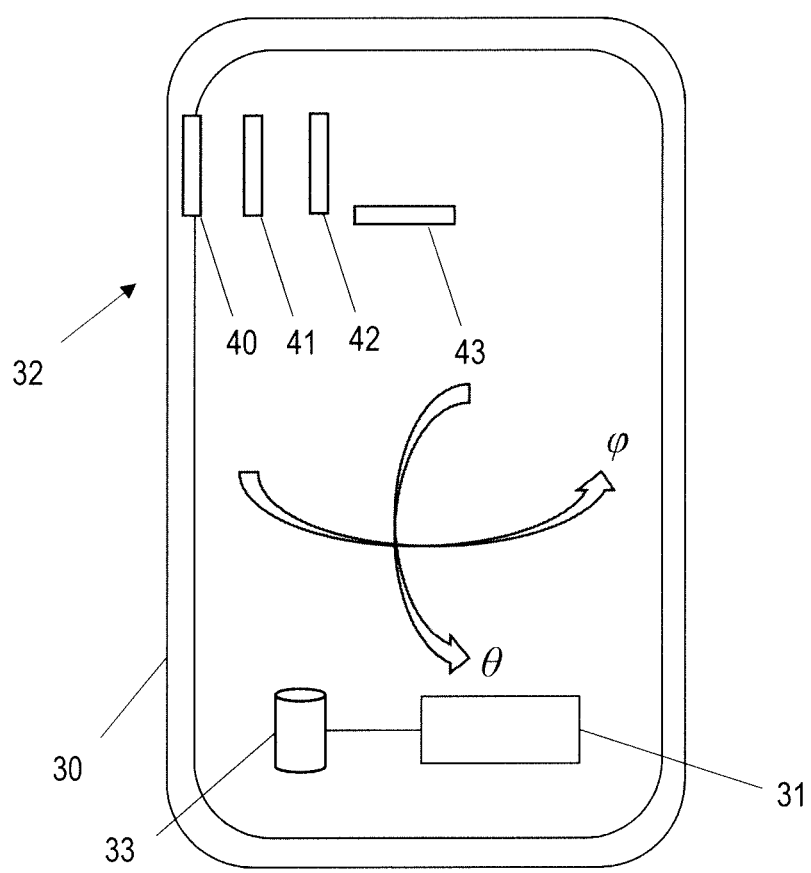
FIG. 2 shows schematically a terminal device according to an embodiment of the present invention.

FIG. 2 shows the terminal 30 in more detail. The antenna array 32 comprises a plurality of antenna elements 40 to 43. The antenna elements 40 to 43 may comprise so-called conformal antennas which are designed to conform or follow some prescribed shape, for example a shape of a housing of the terminal 30 or a shape of a display or printed circuit board of the terminal 30. The antenna elements 40 to 43 may be arranged at different locations of the terminal 30, for example some of the antenna elements may be arranged at a top side of the terminal 30 and some may be arranged at a bottom side of the terminal 30. Thus, each of the antenna elements 40 to 43 may have different transmission characteristics with respect to directionality and sensitivity. Furthermore, due to their spatially different locations, the antenna elements 40 to 43 may have different phase characteristics. The terminal 30 may comprise furthermore associated (not shown) transceivers for the antenna elements 40 to 43. Additionally, the terminal 30 comprises a terminal logic 31, for example a controller or microprocessor, which is coupled to the transceivers of the antenna elements 40 to 43. A memory 33 is coupled to the terminal logic 31 for storing information, in particular the preset antenna configurations as will be described below in detail. The terminal 30 may comprise some more components, for example a display, a graphical user interface and a battery, but these components are not shown in FIG. 1 for clarity reasons.

Figure 3:
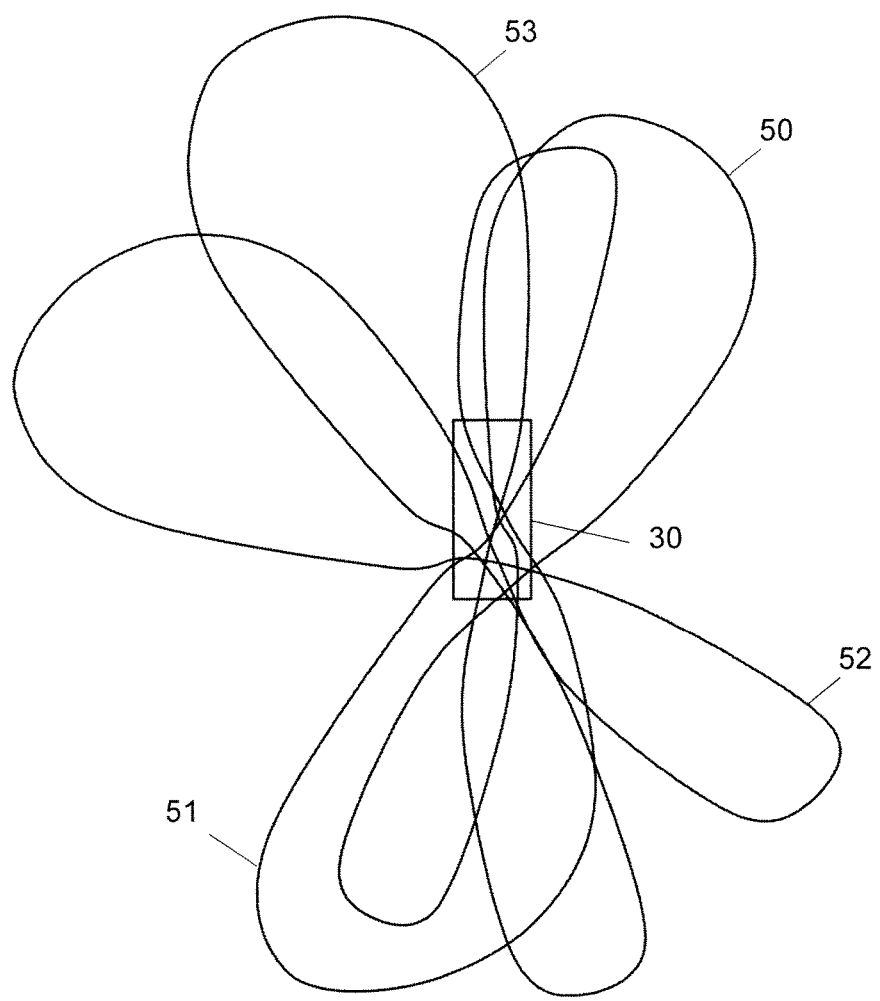
FIG. 3 shows schematically beamforming patterns of a terminal device according to an embodiment of the present invention.

In contrast to linear antenna arrays, in particular conformal antenna elements show a complex and non-uniform spatial reception sensitivity. FIG. 3 shows exemplary antenna beams 50 to 53 of the conformal antennas 40 to 43 of the terminal device 30. Thus, depending on an orientation of the terminal device 30, a reception sensitivity may vary significantly. In other words, even at the same location, the terminal device 30 may show significantly different reception sensitivities when being rotated in the directions Theta and Phi shown in FIG. 2.

When operating the terminal device 30 in the cellular MIMO system 10, the terminal device 30 will employ a plurality of antenna elements to form a kind of antenna array to compensate a path loss, in particular at millimeter wave transmissions, and increase the ranking of mobile channels. Therefore, the antenna array needs to cover most of the incoming wave angles with dual polarization, which may be accomplished with a conformal antenna array providing a sufficient coverage efficiency. It is to be noticed that the conformal antenna array is not a traditional linear array which may have limited coverage angle and single polarization. When using arbitrary conformal antenna arrays, a digital beamforming may be preferred to get best beamforming gain in wide angle range, as for such complex systems it is difficult to use traditional analogue beamforming technologies.

A wireless transmission performance, a so-called over the air (OTA) performance, may be increased with the number of antenna elements in the terminal device 30. For example, a higher rank the transmission may be enabled or an overall antenna gain may be increased under poor reception conditions by adequately combining the signals from the plurality of antenna elements. Combining the signals from the plurality of antenna elements may comprise for example phase shifting each antenna signal by a phase angle and weighting each antenna signal by a weighting factor. In this context, the weighting factor is also called amplitude. The phase angle and the weighting factor have to be configured individually for each antenna element. Such a configuration of the antenna elements is also called precoding.

Under good and rich reception conditions, when a signal-to-noise ratio is large, a pilot signal based channel sounding technology may be used to adapt the configuration of the antenna elements 40 to 43 of the antenna array 32. The pilot signal based channel sounding technology may involve a maximum ratio combining (MRC) technology for determining and optimising phase and amplitude parameters for each antenna element 40 to 43.

Figure 4:
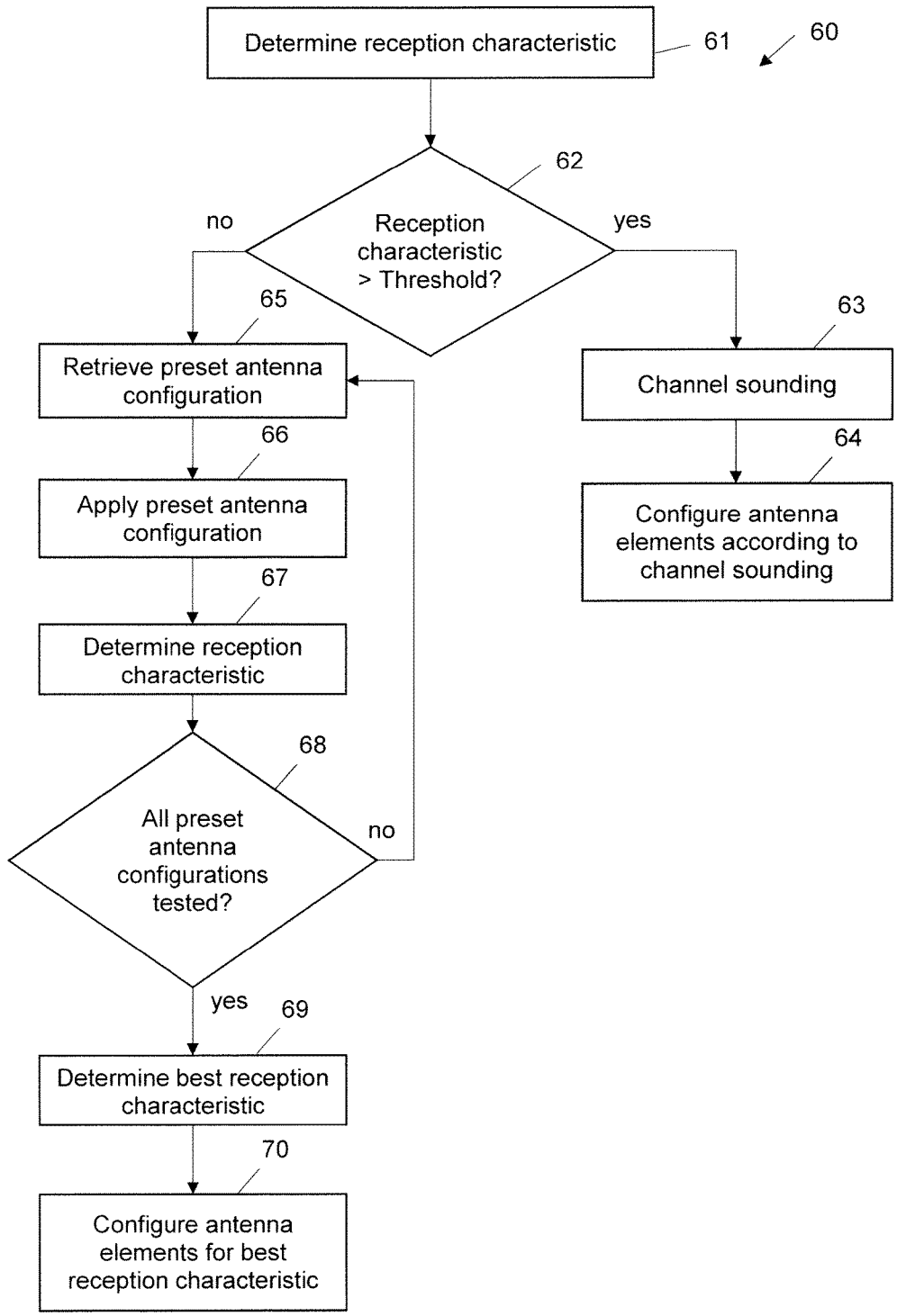
FIG. 4 shows a flowchart comprising method steps according to an embodiment of the present invention.

However, when operating close to the noise floor, the pilot signals may be below the noise floor for individual antenna elements. Thus, MRC is not feasible under these conditions. A selection of a single antenna element may also not work under these conditions as the signal received at a single antenna element may not be strong enough. Therefore, the processing unit 31 of the terminal device 32 may perform a method 60 comprising method steps 61-70 as shown in FIG. 4.

In step 61 the processing unit 31 determines a reception characteristic under current conditions. For example, a common signal-to-noise ratio based on a signal-to-noise ratio determined for each antenna element 40 to 43 maybe determined. In step 62 the determined reception characteristic, for example the common signal-to-noise ratio, is compared with a predetermined threshold. The ratio may be in a range of 0 to 1 dB. Thus, in step 62 it is determined, whether the current reception conditions are near the noise floor or not. In case the signal-to-noise ratio is above the threshold, in step 63 a channel sounding procedure may be performed and in step 64 the antenna elements 40 to 43 may be configured according to the results of the channel sounding.

In case the signal-to-noise ratio is low, the processing unit 31 continues with step 65. In step 65 a preset antenna configuration from a plurality of preset antenna configurations is retrieved from the memory 33. The plurality of preset antenna configurations provided in the memory 33 may have been determined and stored in the memory 33 during a development of the terminal device 30. The memory 33 may provide several tens or even an excess of 100 preset antenna configurations. Each of the plurality of preset antenna configurations provides parameters, for example a phase information and an amplitude information, for each antenna element 40 to 43 such that at least some, for example two or more, of the antenna elements 40 to 43 contribute to receive signal which is further processed in the processing unit 31. The preset antenna configurations are designed such that a total isotropic sensitivity (TIS) may be achieved over large spatial angles Theta and Phi. The plurality of preset antenna configurations may be called codebook and each antenna configuration may be seen as a code of the codebook.

In step 66 the retrieved preset antenna configuration is applied to the antenna array 32. While the antenna array 32 is operating with the applied preset antenna configuration, a reception characteristic of a signal transmission sent from the base station 22 the terminal device 30 is determined in step 67. The determined reception characteristic is stored associated to the preset antenna configuration in the memory 33. The steps 65-67 are repeated for each preset antenna configuration stored in the memory 33. Therefore, after in step 68 the processing unit 31 has determined that all preset antenna configurations have been tested, the method continues in step 69.

In step 69 the best reception characteristic is determined from the reception characteristics determined above in steps 65-67. For example, the best reception characteristic may be the reception characteristic having the best signal-to-noise ratio. The preset antenna configuration associated to the best reception characteristic is retrieved from the memory 33 and the antenna elements 40 to 43 are configured with this configuration for a best reception of future signal transmissions from the base station. Additionally, a search algorithm may be used to improve the performance, for example by a stepwise iterative approach.

The above-described method 60 may be repeated from time to time, for example every few seconds, for ensuring a best reception quality. Additionally, in case the reception quality degrades, the method 60 may be initiated.

To sum up, the use of conformal antenna arrays allows an easier integration and better coverage. A limited number of preset antenna configurations, so-called codes or states, are defined, where antenna signals are combined with different phase and amplitude settings which correspond to antenna gain in different directions and/or polarizations. All these settings are then examined when operating close to the noise and the best setting is selected for further transmissions.

The above-described method may in particular be advantageous at high transmission frequencies, for example at transmission frequencies above 20 GHz. In this case, the antenna aperture becomes close such that in poor reception conditions a selection of the single antenna element may not provide enough antenna gain and a pilot signal based channel sounding is not feasible.

The invention claimed is:

1. A method for adjusting an antenna configuration of a terminal device in a cellular communication system, the cellular communication system comprising a base station and the terminal device. the terminal device being a portable user equipment and comprising a plurality of antenna elements, the method comprising:
   providing, in the terminal device, a plurality of preset antenna configurations, each antenna configuration of the plurality of preset antenna configurations defining phase information and amplitude information for each of the plurality of antenna elements, the phase information and the amplitude information used in combining signals respectively received by the antenna elements,
   determining a reception characteristic of a signal transmission sent from the base station and received at the plurality of antenna elements,
   comparing the determined reception characteristic with a threshold value, in response to the determined reception characteristic is greater than the threshold value, adjusting the antenna configuration according to a channel sounding procedure, and in response to the determined reception characteristic is less than the threshold value, adjusting the antenna configuration by:
- performing consecutively for each preset antenna configuration of the plurality of preset antenna configurations:
  - applying the antenna configuration to the plurality of antenna elements, and
  - determining a reception characteristic of a signal transmission sent from the base station and received at the plurality of antenna elements with the applied antenna configuration,
- selecting one antenna configuration of the plurality of preset antenna configurations based on the plurality of reception characteristics determined for the plurality of preset antenna configurations, and
- applying the selected antenna configuration to the plurality of antenna elements for further signal transmissions.

2. The method according to claim 1, wherein the plurality of antenna elements are arranged at different respective locations of the terminal device to form a conformal antenna conforming a prescribed shape of a component of the terminal device, each antenna element having different transmission properties with respect to polarization, phase and gain for different directions.

3. The method according to claim 1, wherein the plurality of preset antenna configurations is provided in the terminal device as predefined data which has been specifically determined for the type of the terminal device during development of the type of terminal device.

4. The method according to claim 1, further comprising: optimizing the applied antenna configuration by an iterative algorithm.

5. The method according to claim 1, wherein a transmission frequency of the signal transmission is above 26 GHz.

6. The method according to claim 1, wherein the reception characteristic comprises a signal to noise ratio.

7. The method according to claim 1, wherein the plurality of antenna elements are arranged at different respective locations of the terminal device to form a conformal antenna conforming a prescribed shape of a component of the terminal device, each antenna element having different transmission properties with respect to polarization, phase and gain for different directions.

8. The method according to claim 1, wherein the signal transmission comprises at least one of:
- a pilot signal transmission of the channel sounding procedure sent from the base station and received at the plurality of antenna elements, and
- a payload signal transmission sent from the base station and received at the plurality of antenna elements.

9. The method according to claim 1, wherein the threshold value is a signal to noise ratio below 1 dB.

10. A terminal device for a cellular communication system, the cellular communication system comprising a base station and the terminal device, the terminal device being a portable user equipment and comprising:
- a plurality of antenna elements,
- a memory storing a plurality of preset antenna configurations, each antenna configuration of the plurality of preset antenna configurations defining phase information and amplitude information for each of the plurality of antenna elements, the phase information and the amplitude information used in combining signals respectively received by the antenna elements, and
- a processing unit configured
  - to determine a reception characteristic of a signal transmission sent from the base station and received at the plurality of antenna elements,
  - to compare the determined reception characteristic with a threshold value,
  - when the determined reception characteristic is greater than the threshold value, to adjust the antenna configuration according to a channel sounding procedure, and
  - when the determined reception characteristic is less than the threshold value, the processor unit is further configured to:
    - apply consecutively for each preset antenna configuration of the plurality of preset antenna configurations the antenna configuration to the plurality of antenna elements, and
    - determine for each antenna configuration of the plurality of preset antenna configurations a reception characteristic of a signal transmission sent from the base station and received at the plurality of antenna elements with the applied antenna configuration,
    - select one antenna configuration of the plurality of preset antenna configurations based on the plurality of reception characteristics determined for the plurality of preset antenna configurations, and
    - apply the selected antenna configuration to the plurality of antenna elements for further signal transmissions.

11. The terminal device according to claim 10, wherein the plurality of antenna elements are arranged at different respective locations of the terminal device to form a conformal antenna conforming a prescribed shape of a component of the terminal device, each antenna element having different transmission properties with respect to polarization, phase and gain for different directions.

12. The terminal device according to claim 10, wherein the plurality of antenna elements comprises four to sixteen antenna elements.

* * * * *